US011032300B2

(12) United States Patent
Lee et al.

(10) Patent No.: US 11,032,300 B2
(45) Date of Patent: Jun. 8, 2021

(54) INTRUSION DETECTION SYSTEM BASED ON ELECTRICAL CAN SIGNAL FOR IN-VEHICLE CAN NETWORK

(71) Applicant: Korea University Research and Business Foundation, Seoul (KR)

(72) Inventors: Dong Hoon Lee, Seoul (KR); Wonsuk Choi, Seoul (KR); Kyung Ho Joo, Seoul (KR); Moon Chan Park, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 112 days.

(21) Appl. No.: 15/822,471

(22) Filed: Nov. 27, 2017

(65) Prior Publication Data

US 2019/0028500 A1 Jan. 24, 2019

(30) Foreign Application Priority Data

Jul. 24, 2017 (KR) .................. 10-2017-0093304

(51) Int. Cl.
*H04L 29/06* (2006.01)
*H04L 12/40* (2006.01)

(52) U.S. Cl.
CPC .... *H04L 63/1425* (2013.01); *H04L 12/40032* (2013.01); *H04L 63/0876* (2013.01);
(Continued)

(58) Field of Classification Search
CPC ....... H04L 63/14; H04L 1/24; H04L 63/1425; H04L 12/40032; H04L 2012/40273; H04L 2012/40215; H04L 63/0876; G06F 1/12
(Continued)

(56) References Cited

U.S. PATENT DOCUMENTS 9,331,854 B2 * 5/2016 Oguma .................... H04L 9/32
9,989,575 B2 * 6/2018 Du ............................ H04L 1/24
(Continued)

FOREIGN PATENT DOCUMENTS

KR   10-1508497   4/2015
KR   10-1524143   5/2015
(Continued)

OTHER PUBLICATIONS

Office Action dated Sep. 1, 2018 in counterpart Korean Patent Application No. 10-2017-0093304 and English-language translation thereof.
(Continued)

*Primary Examiner* — Bryan F Wright
(74) *Attorney, Agent, or Firm* — Nixon & Vanderhye, P.C.

(57) ABSTRACT

An example ECU identifying apparatus transmits and receives CAN data to and from a plurality of ECUs. The ECU identifying apparatus measures a power signal of the received CAN data, generates a multi-class classifier with respect to each of the plurality of ECUs and a one-class classifier with respect to all ECUs, acquires identification information of the received CAN data, acquires a signal of a predetermined area from the measured power signal, calculates a predetermined attribute value based on the signal of the predetermined area which is acquired, identifies an ECU based on the identification information of the CAN data which is acquired and the calculated predetermined attribute value, and determines whether an attack is made based on the identified ECU.

16 Claims, 11 Drawing Sheets

(52) U.S. Cl.
CPC ............... *H04L 2012/40215* (2013.01); *H04L 2012/40273* (2013.01)

(58) Field of Classification Search
USPC ......................................................... 726/23
See application file for complete search history.

(56) References Cited

U.S. PATENT DOCUMENTS

| | | | |
|---|---|---|---|
| 2013/0279795 A1 | 10/2013 | Shlain et al. | |
| 2017/0286675 A1* | 10/2017 | Shin | ......................... G06F 1/12 |
| 2018/0196941 A1* | 7/2018 | Ruvio | ................. H04W 12/122 |
| 2018/0270196 A1* | 9/2018 | Bathurst | ................. H04L 63/14 |
| 2020/0145251 A1* | 5/2020 | Hass | ....................... H04L 12/40 |

FOREIGN PATENT DOCUMENTS

| | | |
|---|---|---|
| KR | 10-1599764 | 3/2016 |
| KR | 10-1666569 | 10/2016 |
| KR | 10-1669946 | 10/2016 |
| KR | 10-1714526 | 3/2017 |

OTHER PUBLICATIONS

Choi, Wonsuk et al., "Identifying ECUs Using Inimitable Characteristics of Signals in Controller Area Networks," Corr, Jul. 2, 2016, pp. 1-12.

* cited by examiner

FIG. 7A

| Feature | Description | Feature | Description |
|---|---|---|---|
| Mean | $\mu = \frac{1}{N}\sum_{i=1}^{N} x(i)$ | RMS | $RMS = \sqrt{\frac{1}{N}\sum_{i=1}^{N}(x(i))^2}$ |
| Standard Deviation | $\sigma = \sqrt{\frac{1}{N}\sum_{i=1}^{N}(x(i)-\mu)^2}$ | Minimum Value | $L = Min\{x(i) \mid i = 1 \ldots N\}$ |
| Average Deviation | $D = \frac{1}{N}\sum_{i=1}^{N}\|x(i)-\mu\|$ | Maximum Value | $H = Max\{x(i) \mid i = 1 \ldots N\}$ |
| Skewness | $\gamma = \frac{1}{N}\left(\sum_{i=1}^{N}\left(\frac{x(i)-\mu}{\sigma}\right)\right)$ | ZCR | $ZCR = \frac{1}{N}\sum_{i=1}^{N}\|s(i)-s(i-1)\|$, where $s(t) = 1$ if the signal has a positive amplitude at time t and 0 otherwise |
| Kurtosis | $\beta = \frac{1}{N}\left(\sum_{i=1}^{N}\left(\frac{x(i)-\mu}{\sigma}\right)^4\right)$ | Non-negative Count | $NC = \|S\|$, where $S = \{i \mid x(i) \geq 0\}$ |

FIG. 7B

| Feature | Description |
|---|---|
| Spec. Centroid | $\mu = \dfrac{\sum_{i=1}^{N} y_f(i) \cdot y_m(i)}{\sum_{i=1}^{N} y_m(i)}$ |
| Spec. Entropy | $H = \sum_{i=1}^{N} w_i \cdot \log_2 w_i$, where $w_i = \dfrac{y_m(i)}{\sum_{i=1}^{N} y_m(i)}$ |
| Spec. Spread | $\sigma = \sqrt{\sum_{i=1}^{N} ((f_i - \mu)^2 \cdot w_i)}$ |
| Spec. Skewness | $\text{Skewness} = \dfrac{\sqrt{\sum_{i=1}^{N} ((f_i - \mu)^3 \cdot w_i)}}{\sigma^3}$ |
| Spec. Kurtosis | $\text{Kurtosis} = \dfrac{\sqrt{\sum_{i=1}^{N} ((f_i - \mu)^4 \cdot w_i)}}{\sigma^4}$ |
| Spec. Flatness | $\dfrac{(\prod_{i=1}^{N} y_m(i))^{\frac{1}{N}}}{\frac{1}{N}\sum_{i=1}^{N} y_m(i)}$ |
| Spec. Brightness | $\text{Brightness} = \sum_{i=f_c}^{N} y_m(i)$, where $f_c$ is the Cut-off frequency |
| Spec. Roll-off | $\underset{f \in \{1,\ldots N\}}{\arg\min} \sum_{i=1}^{N} y_m(i) \geq 0.85 \cdot \sum_{i=1}^{N} y_m(i)$ |
| Spec. Irregularity | $\text{Irregularity} = \dfrac{\sum_{i=1}^{N} (y_m^2(i) - y_m^2(i+1))^2}{\sum_{i=1}^{N} y_m^2(i)}$ |
| Spec. flux | $\text{flux} = \sum_{i=1}^{N} (N(i) - N(i+1))^2$, where $N(i)$ is the normalized magnitude as $N(i) = \dfrac{y_m(i)}{\sum_{i=1}^{N} y_m(i)}$ |

FIG. 8

| | CAN ID |
|---|---|
| | 0x010 |
| ECU A | 0x00A |
| | 0x3B |

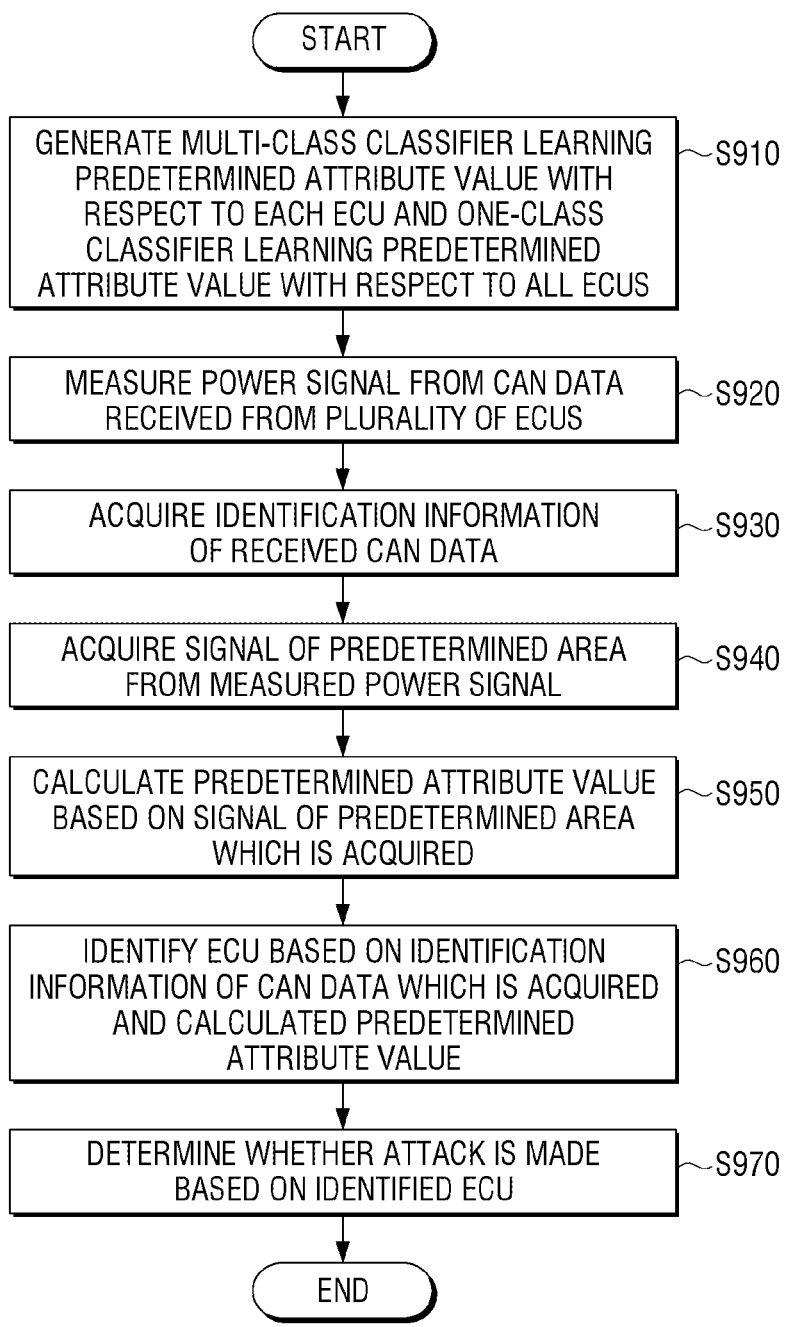

INTRUSION DETECTION SYSTEM BASED ON ELECTRICAL CAN SIGNAL FOR IN-VEHICLE CAN NETWORK

CROSS-REFERENCE TO RELATED APPLICATION

This application is based on and claims priority from Korean Patent Application No. 10-2017-0093304, filed in the Korean Intellectual Property Office on Jul. 24, 2017, the disclosure of which is incorporated herein by reference in its entirety.

BACKGROUND

1. Field

Apparatuses and methods consistent with example embodiments relate to an ECU identifying apparatus and a controlling method thereof, and more particularly, to an ECU identifying apparatus for identifying an ECU based on a power signal of a CAN signal of a vehicle, and a controlling method thereof.

2. Description of Related Art

Various electronic control units (ECUs) have been recently installed in vehicles for the convenience and safety of the driver. One ECU is responsible for specific functions such as brake, engine, etc., and several ECUs construct a network in the vehicle to exchange information about a state of the vehicle. ECUs in the in-vehicle network have been applying the Controller Area Network (CAN) Protocol, which is advantageous in the network structure, to the internal network for mutual communication. In general, the in-vehicle network to which the CAN protocol is applied is referred to as an in-vehicle CAN network.

A fundamental problem with the vehicle hacking introduced so far is that the CAN protocol does not support message authentication. Since message authentication is not possible, an attacker or hacker can access the in-vehicle CAN network and control the vehicle only by sending a message for controlling the vehicle. Since the network of the CAN protocol is a BUS network structure, accessing the network is relatively simpler than other network structures. Furthermore, in recent years, with the advent of telematics services, there is a possibility to access in-vehicle CAN networks remotely. In other words, remote users can use the telematics device as a channel to access the in-vehicle CAN network.

Intrusion Detection System (IDS) technology is attracting attention as one of security technologies applicable to in-vehicle CAN network. IDS technology has the advantage that it can be easily applied to already-sold vehicles because it installs new devices in the in-vehicle CAN network and does not require manipulation of existing ECUs or other devices.

SUMMARY

1. Technical Problem

Example embodiments relate to accurately identifying abnormal ECU messages without problems such as increased communication traffic in the in-vehicle CAN network.

In addition, the object of the present disclosure is to provide higher security compared with existing IDS technology that can be applied to existing in-vehicle CAN network and can be bypassed.

2. Solution to Problem

According to an aspect of an exemplary embodiment, there is provided an ECU identifying apparatus, comprising: a communication interface configured to transmit and receive CAN data to and from a plurality of ECUs; and a processor configured to measure a power signal of the received CAN data, wherein the processor generates a multi-class classifier that learns a predetermined attribute value with respect to each of the plurality of ECUs and a one-class classifier that learns the predetermined attribute value with respect to all ECUs, acquires identification information of the received CAN data, acquires a signal of a predetermined area from the measured power signal, calculates the predetermined attribute value based on the signal of the predetermined area which is acquired, in response to an ECU transmitting the CAN data being an internal ECU, identifies an ECU based on identification information included in the multi-class classifier, identification information of the CAN data which is acquired and the calculated predetermined attribute value, in response to an ECU transmitting the CAN data being an external ECU, identifies an ECU based on identification information included in the one-class classifier, the identification information of the CAN data which is acquired and the calculated predetermined attribute value, and determines whether an attack is made based on the identified ECU.

The signal of the predetermined signal may be a signal of a dominant area, a signal of a recessive area, a signal of a positive-slope area, a signal of a negative-slope area, a signal of a dominant-recessive-dominant (DRD) area and a signal of a recessive-dominant-recessive (RDR) area.

The processor may measure the power signal in an area from after an ID field to before ACK field of the received CAN data.

In addition, the predetermined attribute value may be a mean, a root mean square (RMS), standard deviation, minimum value, average deviation, maximum value, skewness, zero crossing rate (ZCR), kurtosis or non-negative count of a time domain, and may be a centroid, flatness, entropy, brightness, spread, roll-off, skewness, irregularity, kurtosis or flux of a frequency domain.

The processor may, in response to the predetermined attribute value being changed, update the multi-class classifier or the one-class classifier based on a predetermined standard.

The processor may, in response to determining that the CAN data being received from an internal ECU, identify an internal ECU that transmits the CAN data based on identification information with respect to an ECU of the generated multi-class classifier including an attribute value corresponding to the calculated predetermined attribute value and the identification information of the CAN data which is acquired.

The processor may, in response to identification information of an ECU of the generated multi-class classifier not being identical to the identification information of the CAN data which is acquired, determine that an attack is made through the internal ECU.

The processor may, in response to determining that the CAN data is received from an external apparatus, identify an external apparatus that transmits the CAN data based on identification information with respect to an ECU included in the generated one-class classifier including an attribute value corresponding to the calculated predetermined attribute value and the identification information of the CAN data which is acquired.

The processor may, in response to identification information with respect to an ECU included in the generated one-class classifier not being identical to the identification information of the CAN data which is acquired, determine that an attack is made through the external apparatus.

The identification information may be at least one from among a CAN ID and command information of a transmission ECU.

According to an aspect of an exemplary embodiment, there is provided A method of controlling an ECU identifying apparatus, the method comprising: generating a multi-class classifier that learns a predetermined attribute value with respect to each of ECUs and a one-class classifier that learns the predetermined attribute value with respect to all ECUs; measuring a power signal from CAN data received from a plurality of ECUs; acquiring identification information of the received CAN data; acquiring a signal of a predetermined area from the measured power signal; calculating the predetermined attribute value based on the signal of the predetermined area which is acquired; in response to an ECU transmitting the CAN data being an internal ECU, identifying an ECU based on identification information included in the multi-class classifier, identification information of the CAN data which is acquired and the calculated predetermined attribute value, and in response to an ECU transmitting the CAN data being an external ECU, identifying an ECU based on identification information included in the one-class classifier, the identification information of the CAN data which is acquired and the calculated predetermined attribute value; and determining whether an attack is made based on the identified ECU.

The signal of the predetermined signal may be a signal of a dominant area, a signal of a recessive area, a signal of a positive-slope area, a signal of a negative-slope area, a signal of a dominant-recessive-dominant (DRD) area and a signal of a recessive-dominant-recessive (RDR) area.

The measuring the power signal may include measuring the power signal in an area from after an ID field to before ACK field of the received CAN data.

In addition, the predetermined attribute value may be a mean, a root mean square (RMS), standard deviation, minimum value, average deviation, maximum value, skewness, zero crossing rate (ZCR), kurtosis or non-negative count of a time domain, and may be a centroid, flatness, entropy, brightness, spread, roll-off, skewness, irregularity, kurtosis or flux of a frequency domain.

The method may further include, in response to the predetermined attribute value being changed, updating the multi-class classifier or the one-class classifier based on a predetermined standard.

The identifying the ECU comprises, in response to determining that the CAN data being received from an internal ECU, identifying an internal ECU that transmits the CAN data based on identification information with respect to an ECU of the generated multi-class classifier including an attribute value corresponding to the calculated predetermined attribute value and the identification information of the CAN data which is acquired.

The identifying the ECU may include, in response to identification information of an ECU of the generated multi-class classifier not being identical to the identification information of the CAN data which is acquired, determining that an attack is made through the internal ECU.

The identifying the ECU may include, in response to determining that the CAN data is received from an external apparatus, identifying an external apparatus that transmits the CAN data based on identification information with respect to an ECU included in the generated one-class classifier including an attribute value corresponding to the calculated predetermined attribute value and the identification information of the CAN data which is acquired.

The identifying the ECU may include, in response to identification information with respect to an ECU included in the generated one-class classifier not being identical to the identification information of the CAN data which is acquired, determining that an attack is made through the external apparatus.

The identification information may be at least one from among a CAN ID and command information of a transmission ECU.

3. Effect of the Invention

According to the various exemplary embodiments described above, an ECU identifying apparatus may accurately identify abnormal ECU messages without problems such as increased communication traffic in the in-vehicle CAN network.

In addition, higher security compared with existing IDS technology that can be applied to existing in-vehicle CAN network and can be bypassed can be provided.

Further, an ECU transmitting messages can be accurately identified in consideration of changing characteristics such as temperature changes or aging even when the characteristics of the power signal change slowly.

BRIEF DESCRIPTION OF THE DRAWINGS

The above and/or other aspects will become more apparent by reference to example embodiments which are illustrated in the appended drawings. Understanding that these drawings depict only example embodiments and are not therefore to be considered to be limiting of the scope of the disclosure, the principles herein are described and explained with additional specificity and detail via the use of the accompanying drawings, in which:

FIG. 7A is a diagram illustrating an attribute value of a time domain, according to an example embodiment;

FIG. 7B is a diagram illustrating an attribute value of a frequency domain, according to an example embodiment;

FIG. 8 is a diagram illustrating an example embodiment of a CAN ID; and

FIG. 9 is a flowchart of a method for controlling an ECU identifying apparatus, according to an example embodiment.

DETAILED DESCRIPTION

Figure 1:
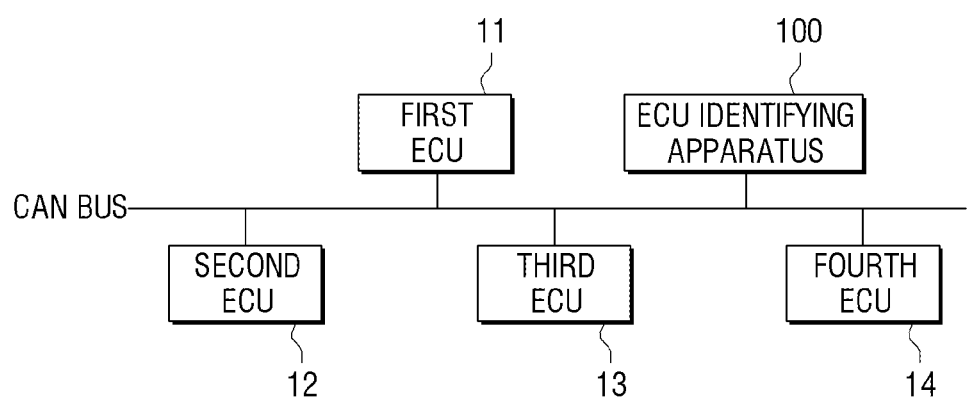
FIG. 1 is a diagram illustrating a Controller Area Network (CAN) communication network, according to an example embodiment.

Exemplary embodiments will now be described in detail with reference to the accompanying drawings. The exemplary embodiments described herein can be variously modified. Aspects of exemplary embodiments are described in the drawings and may be described in detail in the detailed description. It should be understood, however, that the specific exemplary embodiments illustrated in the accompanying drawings are only intended to facilitate understanding of the various exemplary embodiments. Accordingly, it is to be understood that the technical idea is not limited by the specific exemplary embodiments illustrated in the accompanying drawings, but includes all equivalents or alternatives falling within the spirit and scope of the invention.

Terms including ordinals, such as first, second, etc., may be used to describe various elements, but such elements are not limited to the above terms. The above terms are used only for the purpose of distinguishing one component from another.

Throughout this specification, it will be understood that the term "comprise" and variations thereof, such as "comprising" and "comprises", specify the presence of features, numbers, steps, operations, components, parts, or combinations thereof, described in the specification, but do not preclude the presence or addition of one or more other features, numbers, steps, operations, components, parts, or combinations thereof. It is to be understood that when an element is referred to as being "connected" or "accessed" to another element, it may be directly connected or accessed to the other element, but it should be understood that there may be other components in between. On the other hand, when an element is referred to as being "directly connected" or "directly accessed" to another element, it should be understood that there are no other elements in between.

The terms "module" or "unit" for components used in the present specification performs at least one function or operation. And a "module" or a "unit" may perform functions or operations by hardware, software, or a combination of hardware and software. Also, a plurality of "modules" or a plurality of "units" other than "modules" or "units" that are to be performed in a specific hardware or performed in at least one processor may be integrated into at least one module. It is to be understood that the singular forms "a," "an," and "the" include plural referents unless the context clearly dictates otherwise.

In describing example embodiments, detailed description of relevant known functions or components may be omitted if it would obscure the description of the subject matter.

FIG. 1 is a diagram illustrating a Controller Area Network (CAN) communication network, according to an example embodiment.

Referring to FIG. 1, a CAN communication network includes a plurality of Electronic Control Units (ECUs) 11, 12, 13 and 14 and an ECU identifying apparatus 100. A plurality of ECUs 11, 12, 13 and 14 and an ECU identifying apparatus 100 are connected to one bus. In FIG. 1, four ECUs 11, 12, 13 and 14 are illustrated. However, a CAN communication network can have fewer than four ECUs or more than four ECUs. A bus includes two communication lines: CAN_H (or CAN High) and CAN_L (or CAN Low). When one ECU transmits a value of zero, i.e., a dominant state, a voltage of approximately 3.5V may flow through the CAN-H, and when one ECU transmits a value of 1, i.e., a recessive state, a voltage of approximately 2.5V may flow through two lines of CAN-H and CAN-L.

Each of the plurality of ECUs 11, 12, 13 and 14 controls a corresponding operation of the vehicle. For example, a first ECU 11 may control the engine, and a second ECU 12 may control the brake, and a third ECU 13 may control the accelerator, and a fourth ECU 14 may control the wiper. In addition, each of the plurality of ECUs 11, 12, 13 and 14 may communicate with one another via the bus. Accordingly, each of the plurality of ECUs 11, 12, 13 and 14 may include a communication interface for transmitting and receiving messages.

Each of the plurality of ECUs 11, 12, 13 and 14 is connected to the bus and communicates in a broadcast method. For example, when an ECU to transmit data broadcasts data including a CAN ID and information of a transmission ECU according to a CAN data standard to the bus, all ECUs connected to the bus receive the data and only the ECU which filters the CAN ID included in the CAN data standard processes the CAN data.

The ECU identifying apparatus 100 receives CAN data received from an ECU. The CAN data may be a message received from an ECU. The ECU identifying apparatus 100 measures a power signal of the received CAN data. The ECU identifying apparatus 100 acquires a signal of a predetermined area from the measured power signal. In addition, the ECU identifying apparatus 100 calculates a predetermined attribute value based on the acquired signal. Meanwhile, the ECU identifying apparatus 100 acquires identification information of CAN data from the received CAN data. For example, the identification information of the CAN data may be a CAN ID or command information of an ECU that transmits the CAN data.

The ECU identifying apparatus 100 may determine an ECU based on the predetermined attribute value that is calculated. In addition, the ECU identifying apparatus 100 may determine whether the determined ECU and identification information of the CAN data which is acquired. When the determined ECU coincides with the identification information of the CAN data which is acquired, the ECU identifying apparatus 100 determines that the message is a normal ECU message. When the determined ECU does not coincide with the identification information of the CAN data which is acquired, the ECU identifying apparatus 100 may determine that the message is an attack message. In other words, the ECU identifying apparatus 100 may identify an ECU transmitting the message and determine whether the message is a normal ECU message or an attack message.

Accordingly, the ECU identifying apparatus is applicable to existing CAN network system and has no drawbacks such as message traffic and the like. In addition, the ECU identifying apparatus 100 may determine whether a message is an attack message or not by determining an ECU by using a plurality of attribute values and identification information of CAN data.

A block diagram of the ECU identifying apparatus 100 will be described below.

Figure 2:
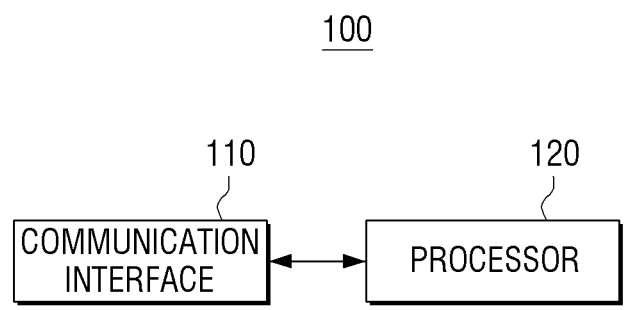
FIG. 2 is a block diagram illustrating an Electronic Control Unit (ECU) identifying apparatus, according to an example embodiment.

FIG. 2 is a block diagram illustrating an Electronic Control Unit (ECU) identifying apparatus, according to an example embodiment.

Referring to FIG. 2, the ECU identifying apparatus 100 includes a communication interface and a processor 120.

The communication interface transmits and receives CAN data from a plurality of ECUs. As described above, the communication interface 110 includes two communication lines CAN-H and CAN-L which are connected to a CAN network bus. For example, when the communication interface 110 receives a value of zero, i.e., dominant state, a voltage of approximately 3.5V may flow through the CAN-H and a voltage of approximately 1.5V may flow through the CAN-L. In addition, when the communication interface 110 receives a value of 1, i.e., recessive state, a voltage of approximately 2.5V may flow through the CAN-H and CAN-L. The communication interface 110 may receive CAN data which is received from an ECU based on a voltage applied to the CAN-H and the CAN-L.

The processor 120 measures a power signal of the received CAN data. As described above, CAN data which is transmitted from the ECU to the communication interface 110 may be represented as a voltage. A voltage of CAN data refers to a power signal. Accordingly, the processor 120 measures a power signal of the received CAN data. The processor 120 may measure a power signal in an area before the ACK field after an ID field of the received CAN data. In addition, the processor 120 may determine an ECU by performing a pre-processing process, a learning process and an identifying process and determine whether an invasion is made.

Specifically, the processor 120 may perform a pre-processing process. The pre-processing process refers to a process of acquiring a signal of a predetermined area from a measured power signal and calculating a predetermined attribute value based on the acquired signal.

First, the processor 120 acquires a signal of a predetermined area from a measured power signal. For example, the signal of the predetermined signal may refer to a signal of a dominant area, a signal of a recessive area, a signal of a positive-slope area, a signal of a negative-slope area, a signal of a dominant-recessive-dominant (DRD) area and a signal of a recessive-dominant-recessive (RDR) area. The detailed description of each of the areas will be provided below.

In addition, the processor 120 calculates a predetermined attribute value based on the acquired signal. The predetermined attribute value may include an attribute value of a time area and a time value of a frequency area. For example, the predetermined attribute value may be a mean, a root mean square (RMS), standard deviation, minimum value, average deviation, maximum value, skewness, zero crossing rate (ZCR), kurtosis or non-negative count of a time domain, and may be a centroid, flatness, entropy, brightness, spread, roll-off, skewness, irregularity, kurtosis or flux of a frequency domain. All the attribute values mentioned above may be used or any one or more attribute values alone may be used.

Meanwhile, the processor 120 acquires identification information of CAN data from the received CAN data. For example, the identification information of the CAN data may be a CAN ID of a transmission ECU, command information, etc.

The processor 120 may perform a learning process. The learning process is a process of generating a classifier by using the calculated attribute value, and in response to an attribute value of an ECU being changed, updating an attribute value within the corresponding classifier. The processor 120 may generate a one-class classifier for determining whether an external attack is made and a multi-class classifier for determining whether an internal attack is made. The one-class classifier is to include all ECUs in one class, and the multi-class classifier is to divide each of ECUs into classes.

Meanwhile, information relating to an attribute value may be initially provided by the manufacturer and a classifier may be generated. In addition, a classifier may be generated through a supervised learning process. For example, when a classifier is generated, a machine learning algorithm, such as support vector machine (SVM) and the like, may be used. For learning, multiple CAN power signals may be collected in advance. A one-class classifier and multi-class classifier which are generated in a learning process may be used to determine whether an ECU transmitting CAN data is a normal ECU or an ECU that attacks with malicious intent.

The processor 120 may perform an identifying process. The processor 120 may compare the calculated predetermined attribute value with an attribute value included in a multi-class classifier or a one-class classifier. In addition, the processor 120 may compare identification information of CAN data acquired along with an attribute value with the identification information included in a classifier. The processor 120 may determine whether identification information of a multi-class classifier corresponding to the calculated attribute value is the same as the acquired CAN data identification information. In response to the identification information of the multi-class classifier not being the same as the acquired CAN data identification information, the processor 120 may determine that the ECU is an attack ECU. In addition, the processor 120 may determine whether the ECU is an ECU used in the learning process of the one-class classifier. In response to the ECU not being an ECU used in the learning process of the one-class classifier, the processor 120 determines that the ECU is an attack ECU.

Figure 3:
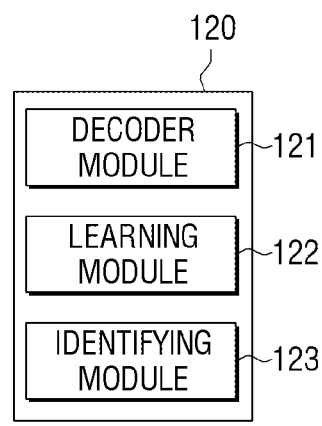
FIG. 3 is a block diagram illustrating a processor, according to an example embodiment.

FIG. 3 is a block diagram illustrating a processor, according to an example embodiment.

Referring to FIG. 3, the processor 120 may include a decoder module 121, a learning module 122, an identifying module 123.

The decoder module 121 may decode a signal received from an ECU to a CAN message. The decoder module 121 may be implemented as one module within the processor 120, or may be implemented as a decoder separate from the processor 120.

The learning module 122 may generate a multi-class classifier and a one-class classifier. As described above, the processor 120 may measure the received power signal of the CAN data, acquire a signal of a predetermined area of the measured power signal, and calculate predetermined attribute values based on the acquired signal.

The learning module 122 may generate a multi-class classifier by dividing the calculated attribute values into ECUs, and include a one-class classifier including attribute values of all ECUs. In addition, in response to attribute values of an ECU being changed, the learning module 122 may update the changed attribute values of the multi-class classifier or the one-class classifier. The multi-class classifier and one-class classifier which are generated in the learning module 122 may be used to identify an ECU by the identifying module 123.

The identifying module 123 may identify an ECU. The identifying module 123 may receive calculated attribute values. In addition, the identifying module 123 may compare the received attribute values with the attribute values included in the multi-class classifier or the one-class classifier. The identifying module 123 may identify an ECU included in the most similar class as the received attribute values. In addition, the identifying module 123 may receive identification information of the CAN data which is acquired. The identifying module 123 may determine whether the ECU is a normal ECU by using the received CAN data identification information. Specifically, the identifying module 123 may determine whether identification information of a multi-class classifier corresponding to the calculated attribute values are the same as the identification information of the CAN data which is acquired. In response to the identification information of the multi-class classifier not being the same as the acquired CAN data identification information, the identifying module 123 may determine that the ECU is an attack ECU. In addition, the identifying module 123 may determine whether the ECU is an ECU used in the learning process of the one-class classifier. The identifying module 123 may determine whether the ECU is an ECU used in the learning process of the one-class classifier. In response to the ECU not being an ECU used in the learning process of the one-class classifier, the identifying module 123 determines that the ECU is an attack ECU.

In an example embodiment, the decoder module 121, the learning module 122 and the identifying module 123 may be implemented as a hardware module, or may be implemented as a software module.

A block diagram of the ECU identifying apparatus 100 has been described above. An process of identifying an ECU will be described below.

Figure 4:
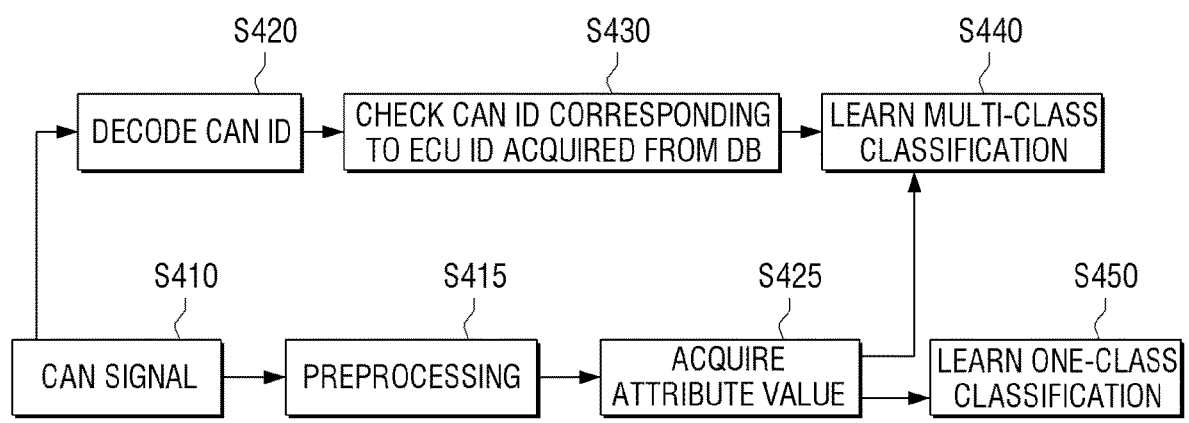
FIG. 4 is a diagram illustrating a learning process, according to an example embodiment.

FIG. 4 is a diagram illustrating a learning process, according to an example embodiment.

Referring to FIG. 4, an ECU identifying apparatus receives a CAN signal, at operation S410. The ECU identifying apparatus may receive a CAN signal from each of a plurality of ECUs. The ECU identifying apparatus performs a preprocessing process, at operation S415. The ECU identifying apparatus measures the received CAN power signal. The ECU identifying apparatus may measure a CAN power signal only from the signal after the ID field to before the ACK field.

As described above, each of the ECUs transmits CAN data in a broadcasting method. Accordingly, a plurality of ECUs may simultaneously transmit CAN data. Accordingly, there is a priority among the plurality of ECUs. For example, if a first ECU has a higher priority than a second ECU, a CAN ID of the first ECU may be set to 000 and a CAN ID of the second ECU may be set to 001. When the first ECU and the second ECU simultaneously transmit CAN data, the ECU identifying apparatus simultaneously receives data from the first ECU and the second ECU until before the ID field. In addition, since the second digits of the ID fields of the first ECU and the second ECU also contain the same value, the ECU identifying apparatus simultaneously receives data from the first ECU and the second ECU. However, the third digit of the ID field of the first ECU is zero and the third digit of the ID field of the second ECU is 1. Accordingly, the first ECU has a higher priority than the second ECU. Accordingly, the first ECU continuously transmits CAN data. However, the second ECU receives the ID field of the first ECU, and in response to identifying that the second ECU has a lower priority than the first ECU, halts data transmission. Accordingly, it may be guaranteed that the CAN data which is received by the ECU identifying apparatus from after the ID field is CAN data received by one ECU. In addition, the ACK field is a field indicating that one CAN data is ended. Accordingly, in a case in which the ECU identifying apparatus measures power from a signal from after the ID field to before the ACK field and a signal of a predetermined area is acquired, it may be guaranteed that the CAN data is data which is sent from one ECU.

The ECU identifying apparatus acquires an attribute value, at operation S425. According to circumstances, a process of extracting an attribute value may be included in the preprocessing process. As described above, the ECU identifying apparatus acquires a signal of a predetermined area of a power signal of CAN data. In addition, the ECU identifying apparatus calculates a predetermined attribute value based on the acquired signal. For example, the signal of the predetermined signal may be a signal of a dominant area, a signal of a recessive area, a signal of a positive-slope area, a signal of a negative-slope area, a signal of a dominant-recessive-dominant (DRD) area and a signal of a recessive-dominant-recessive (RDR) area.

In addition, the predetermined attribute value may be a mean, a root mean square (RMS), standard deviation, minimum value, average deviation, maximum value, skewness, zero crossing rate (ZCR), kurtosis or non-negative count of a time domain, and may be a centroid, flatness, entropy, brightness, spread, roll-off, skewness, irregularity, kurtosis or flux of a frequency domain.

In a case in which ten attribute values of a time domain and ten attribute values of a frequency domain are calculated with respect to each of signals of the six areas mentioned above, the ECU identifying apparatus may calculate a total of 120 attribute values. The ECU identifying apparatus may use all 120 attribute values or may use some of the 120 attribute values.

Meanwhile, the ECU identifying apparatus decodes a CAN signal and acquires a CAN ID included in the transmitted CAN data, at operation S420. In addition, although FIG. 4 illustrates a CAN ID of a transmission ECU included in CAN data, the example is not limited thereto, and the example may apply to any information capable of identifying an ECU transmitting data, such as command information and the like.

The ECU identifying apparatus checks a CAN ID of a transmission ECU corresponding to an ID of an ECU acquired from a database, at operation S430. The ECU identifying apparatus performs a learning process performing classification by a multi-class classifier, at operation S440, and performs a learning process performing classification by a one-class classifier, at operation S450. The ECU identifying apparatus generates a multi-class classifier or a one-class classifier based on a CAN ID and attribute value of a transmission ECU corresponding to an ECU ID acquired from the database.

The multi-class classifier may be generated by collecting multiple CAN power signals for learning in advance. In an example embodiment, the number of CAN power signals required for learning may be about 100 per class. In addition, the one-class classifier learns by regarding an attribute of a CAN power signal collected in the learning process as one class and thus may be generated more simply than the multi-class classifier. Meanwhile, machine learning algorithms which are used to generate a multi-class classifier and a one-class classifier may be different from each other.

Figure 5:
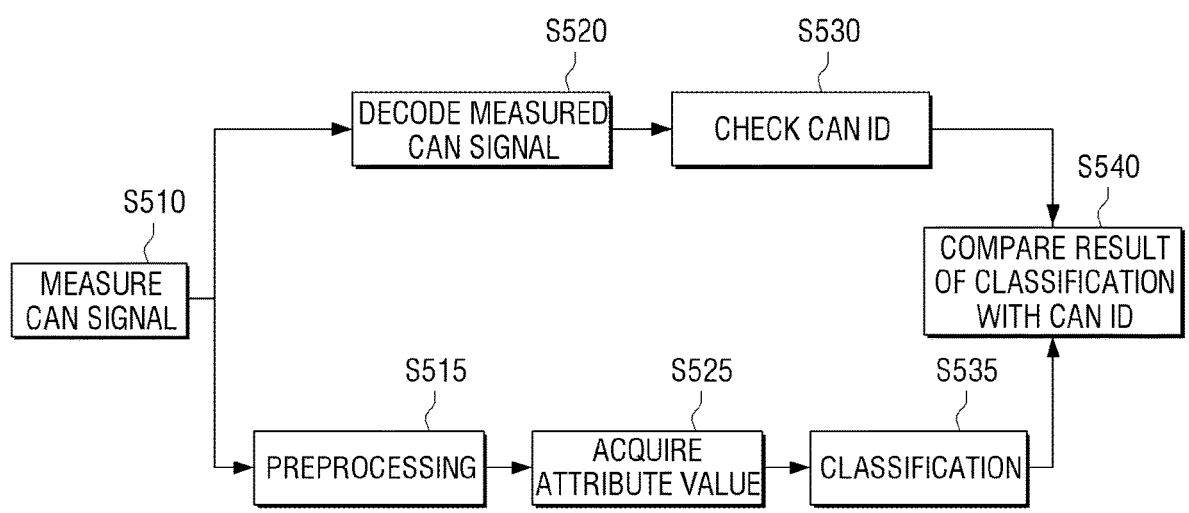
FIG. 5 is a diagram illustrating a process of identifying an ECU, according to an example embodiment.

FIG. 5 is a diagram illustrating a process of identifying an ECU, according to an example embodiment.

Referring to FIG. 5, an ECU identifying apparatus measures a power signal of CAN data, at operation S510. The ECU identifying apparatus performs a preprocessing process, at operation S515. In addition, the ECU identifying apparatus acquires an attribute value, at operation S525. The process described above is similar to the process provided above with reference to FIG. 4 and thus, specific explanation will not be repeated.

The ECU identifying apparatus performs classification as to whether an ECU is identified by a multi-class classifier or a one-class classifier. In a case in which an ECU transmitting CAN data corresponds to an internal ECU, the ECU identifying apparatus may identify an ECU by using a multi-class classifier. For example, an attacker may make an attempt to access an ECU controlling a navigation to increase or decrease an engine RPM. The ECU controlling the navigation is an ECU present within the vehicle, and CAN data increasing or decreasing the engine RPM is data that previously existed. Accordingly, in order for the ECU identifying apparatus to analyze CAN data received from in-vehicle ECU to determine whether intrusion is made, it is necessary to determine whether an attribute value of the ECU and identification information (e.g., CAN ID) of the CAN data are identical. Accordingly, when the ECU identifying apparatus analyzes CAN data transmitted by the internal ECU, the ECU identifying apparatus may identify the ECU by using a multi-class classifier.

Meanwhile, In a case in which an ECU transmitting CAN data corresponds to an external ECU, the ECU identifying apparatus may identify an ECU by using a one-class classifier. For example, an inspector may inspect the vehicle by connecting a diagnostic device with an external terminal for diagnosis of the vehicle. In addition, the attacker may connect a CAN data generation device with the external device to attempt to attack the vehicle by causing abnormal operation of the vehicle. A diagnostic device connected with the external terminal and the CAN data generation device are additional ECUs present outside the vehicle and thus are not included in the multi-class classifier. However, the ECU identifying apparatus must determine that the diagnostic device is an acceptable ECU and that the CAN data generation device made an attempt to attack. Accordingly, when the ECU identifying apparatus analyzes CAN data transmitted by the external ECU, the ECU identifying apparatus may identify the ECU by using a one-class classifier. The one-class classifier may include information relating to an external ECU that is connectible in advance.

Meanwhile, the ECU identifying apparatus decodes a CAN signal and acquires a CAN ID included in the transmitted CAN data, at operation S520. In addition, although FIG. 5 illustrates a CAN ID of a transmission ECU included in CAN data, the example is not limited thereto, and the example may apply to any information capable of identifying an ECU transmitting data, such as command information and the like.

The ECU identifying apparatus checks a CAN ID of a transmission ECU corresponding to an ID of an ECU acquired from a database, at operation S530. In addition, the ECU identifying apparatus may compare the calculated attribute value with an attribute value within a classifier. The ECU identifying apparatus compares a CAN ID of a transmission ECU corresponding to a similar attribute value as a result of the comparison with an ID of an ECU acquired from the database. When the CAN ID of the transmission ECU coincides with the ID of the ECU acquired from the database, the ECU identifying apparatus determines that the received CAN data is normal CAN data. In addition, when the CAN ID of the transmission ECU does not coincide with the ID of the ECU acquired from the database, the ECU identifying apparatus determines that the received CAN data is abnormal data.

In a case in which the comparison is made by using a multi-class classifier, the ECU identifying apparatus may determine normality or abnormality based on whether an attribute value coincides with an ID corresponding to the attribute value. In a case in which the comparison is made by using a one-class classifier, the ECU identifying apparatus may determine normality or abnormality based on whether an attribute value and an ID corresponding to the attribute value are included in the classifier.

Various example embodiments to identify an ECU and determine whether an attack is made is described above. CAN data and a power signal will be described below.

Figure 6A:
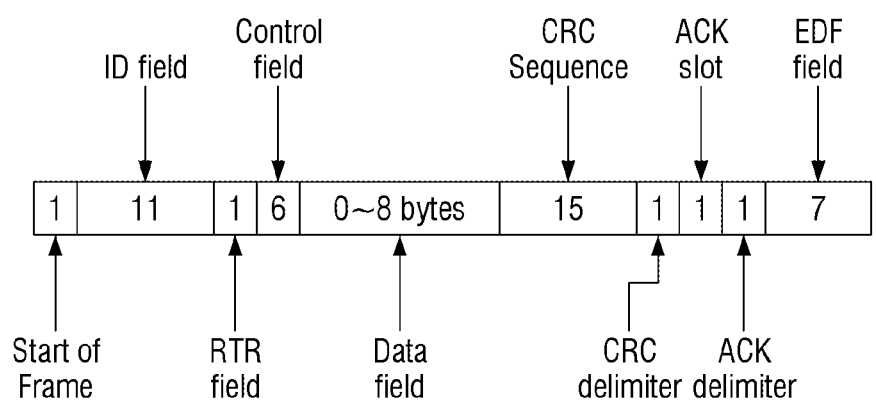
FIG. 6A is a diagram illustrating a CAN data frame format.

FIG. 6A is a diagram illustrating a CAN data frame format.

Referring to FIG. 6A, a CAN data frame format includes a Start of Frame (SOF), an ID (Arbitration) Field, a RTR Field, a Control Field, a Data Field, a CRC Field, an ACK Field and an End of Frame (EOF) Field.

The SOF is a bit indicating a start of a data frame and is assigned 1 bit, and the ID field indicates ID information capable of identifying a transmitter of a data frame and is assigned 11 bits. The RTR Field is a bit distinguishing between a remote frame and a data frame and is assigned one bit. The signal type is one for the remote frame and zero for the data frame.

The Control Field is assigned a total of six bits, and two from among them outputs a fixed value of 00 as a reserved bit, and the remaining four bits represent a data length of the next consecutive data field.

The Data Field refers to data of a data frame and is assigned 64 bits at most. The CRC Field is assigned 16 bits, and 15 bits (CRC Sequence) refers to a CRC value of a data frame and one bit (CRC delimiter) refers to the end of the CRC value and outputs a fixed value of 1.

Two bits are assigned to the ACK Field and contains information that can identify whether data is received or not. In other words, when an arbitrary data transmitter puts a data frame including particular data on a CAN bus, all ECUs connected to the CAN bus identifies whether data currently stored on the bus is data necessary for itself, and in response to determining that the data is necessary, receives the data stored on the CAN bus. In this regard, an ECU receiving the data transmits information indicating that it has received the data to the ACK Field of a data frame output by the data transmitter so that the data transmitter does not output the same data continuously. In other words, data output by an arbitrary data transmitter is fed back to itself after being loaded on the CAN bus, and it is determined whether to retransmit the same data based on the information in the ACK field of the data frame to be fed back. 1 bit (ACK slot) refers to an ACK bit, and the other 1 bit (ACK delimiter) refers to the end of the ACK value and outputs the fixed value of 1.

Finally, seven bits are assigned to the End of Frame (EOF) Field which indicates the end of the frame, and a fixed value of 1111111 is output.

The RTR Field (one bit) of the CAN data frame, the reserved bit (two bits) of the Control Field, the CRC delimiter (one bit) and the EOF Field (seven bits) are fields which always output a fixed value. The ECU identifying apparatus may acquire a power signal from a signal after the ID Field to after the ACK Field regardless of a fixed value is output. Accordingly, the present disclosure may identify an ECU in an data-independent manner.

Figure 6B:
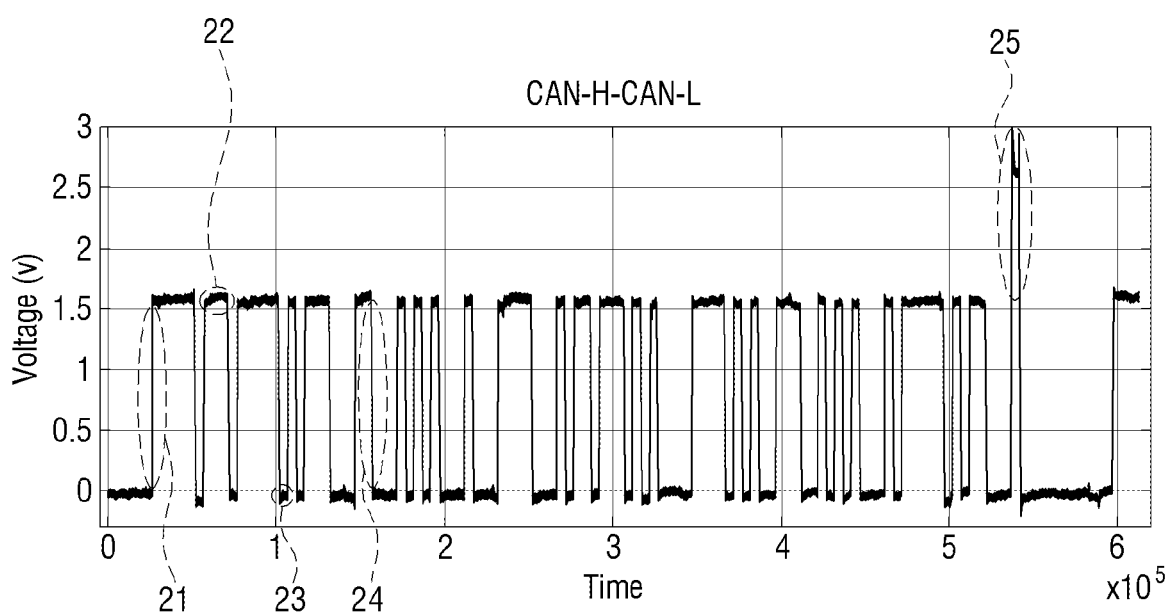
FIG. 6B is a diagram illustrating an example embodiment of a CAN power signal.

FIG. 6B is a diagram illustrating an example embodiment of a CAN power signal.

FIG. 6B illustrates a power signal of a CAN and a signal of a predetermined area which is acquired from the power signal. The power signal of the CAN which is illustrated in FIG. 6B includes CAN data illustrated in FIG. 6A.

From among the power signals illustrated in FIG. 6B, an area indicating a voltage of about 1.5V refers to a dominant area 22 and logically refers to a value of zero. In addition, an area indicating a voltage of about 0V refers to a recessive area 23 and logically refers to a value of 1. In addition, an area in which a voltage transitions from 0V to 1.5V (or logically transitions from 1 to 0) is a positive-slope area 21, and an area in which a voltage transitions from 1.5V to 0V (or logically transitions from 0 to 1) is a negative-slope area 24. In addition, an area 25 in which a peak value is abnormally indicated is an ACK field area.

In addition, a part which is transitioned from the dominant area to the recessive and back to the dominant area is a DRD area, and a part which is transitioned from the recessive area to the dominant area and back to the recessive area is a RDR area. The ECU identifying apparatus acquires a signal with respect to six areas to identify normality of the ECU that transmits a CAN message.

A CAN power signal of one CAN message may include a plurality of areas. Accordingly, the ECU identifying apparatus may use an average value with respect to each of the areas. In addition, the ECU identifying apparatus divides an area into areas corresponding to a length of one bit and acquires the divided area even if the dominant area and the recessive area are continuous.

The ECU identifying apparatus calculates an attribute value on a time domain and a frequency domain based on a signal acquired from each area. A power signal of the CAN data may be slightly different according to an ECU. Accordingly, when a difference of a power signal according to an ECU is calculated in various ways, the difference may be an attribute value intrinsic to the ECU.

FIG. 7A is a diagram illustrating an attribute value of a time domain, according to an example embodiment.

As illustrated in FIG. 7A, an attribute value of a time domain may include a mean, a root mean square (RMS), standard deviation, minimum value, average deviation, maximum value, skewness, zero crossing rate (ZCR), kurtosis or non-negative count of a time domain. Each of the attributes itself is a well-known technique and thus, specific description will not be provided.

FIG. 7B is a diagram illustrating an attribute value of a frequency domain, according to an example embodiment.

As illustrated in FIG. 7B, an attribute value of a frequency domain may include centroid, flatness, entropy, brightness, spread, roll-off, skewness, irregularity, kurtosis, flux, and the like. Each of the attributes itself is a well-known technique and thus, specific description will not be provided.

In the present disclosure, a power signal of an ECU is acquired for identification of the ECU, and a signal of a predetermined area is acquired from the acquired power signal, and an attribute value is calculated using the signal of the predetermined area which is acquired. The calculated attribute value may be a value inherent to each ECU.

As an example, the number of signals in the predetermined area which is acquired is six. In addition, signals of each predetermined area which are acquired may be calculated as 10 attribute values of a time domain and 10 attribute values of a frequency domain. Accordingly, one ECU may have a total of 120 attribute values.

When an attribute value is calculated, an ECU identifying apparatus may perform learning to generate a multi-class classifier and a one-class classifier. The multi-class classifier is to divide each ECU into individual classes, and the one-class classifier is to divide each ECU into a single class. Meanwhile, one ECU may include a plurality of CAN IDs.

Figure 8:
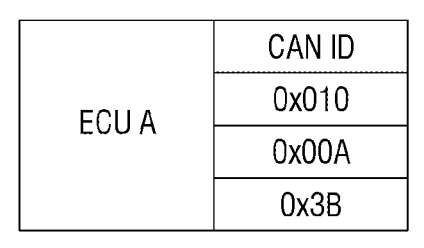

FIG. 8 is a diagram illustrating an example embodiment of a CAN ID.

FIG. 8 illustrates an ECU including a plurality of CAN IDs. In an in-vehicle CAN network, one ECU may use multiple CAN IDs. An ECU identifying apparatus may group CAN Ids having very similar attributes by means of information provided from the manufacturer or a clustering method in order to group the same ECUs. The ECU identifying apparatus may label a plurality of CAN Ids used by one ECU as one class. In other words, the ECU identifying apparatus may manage a table of information capable of identifying a particular ECU, such as CAN ID which is a transmitter ID in a message.

Various example embodiments of a ECU identifying apparatus has been described above. A flowchart of a method of controlling an ECU identifying apparatus will be described below.

FIG. 9 is a flowchart of a method of controlling an ECU identifying apparatus, according to an example embodiment.

Referring to FIG. 9, an ECU identifying apparatus generates a multi-class classifier which learns a predetermined attribute value with respect to each ECU and a one-class classifier which learns a predetermined attribute value with respect to all ECUs, at operation S910. The ECU identifying apparatus may, in response to a CAN message of an internal ECU being received, identify the ECU by means of a multi-class classifier, and in response to a CAN message of an external ECU being received, identify the ECU by means of a one-class classifier. In addition, the ECU identifying apparatus may, in response to a predetermined attribute value being changed, update a multi-class classifier or a one-class classifier according to a predetermined standard. For example, a predetermined standard may include a period, the number of times, etc.

The ECU identifying apparatus measures a power signal from CAN data received from a plurality of ECUs, at operation S920. The ECU identifying apparatus is connected with a plurality of ECUs via a single bus on a CAN communication network. In addition, the ECU identifying apparatus transceiver CAN data to/from a plurality of ECUs. The ECU identifying apparatus measures a power signal with respect to a signal in an area from after an ID field of the CAN data to after an ACK field.

The ECU identifying apparatus acquires identification information of the received CAN data, at operation S930. For example, the identification information of the CAN data may be a CAN ID, command information, etc. A CAN ID refers to an ID of a transmission ECU included in CAN data. In addition, command information may be information relating to an inherent command corresponding to each ECU.

The ECU identifying apparatus acquires a signal of a predetermined area from the measured power signal, at operation S940. For example, the signal of the predetermined signal may be a signal of a dominant area, a signal of a recessive area, a signal of a positive-slope area, a signal of a negative-slope area, a signal of a dominant-recessive-dominant (DRD) area and a signal of a recessive-dominant-recessive (RDR) area. In other words, the number of signals in a predetermined area may be a total of six.

The ECU identifying apparatus calculates a predetermined attribute value based on the signal of a predetermined area which is acquired S950. For example, the predetermined attribute value may be a mean, a root mean square (RMS), standard deviation, minimum value, average deviation, maximum value, skewness, zero crossing rate (ZCR), kurtosis or non-negative count of a time domain, and may be a centroid, flatness, entropy, brightness, spread, roll-off, skewness, irregularity, kurtosis or flux of a frequency domain.

The ECU identifying apparatus identifies an ECU based on identification information of the CAN data which is acquired and a predetermined attribute value, at operation S960. In response to determining that CAN data is received from an internal ECU, the ECU identifying apparatus identifies the ECU based on identification information included in a multi-class classifier, identification information of the CAN data which is acquired, and the calculated predetermined attribute value. In other words, the ECU identifying apparatus may identify an internal ECU which transmits the CAN data based on identification information relating to an ECU of a multi-class classifier including an attribute value corresponding to the calculated predetermined attribute value and identification information of the CAN data which is acquired.

In addition, in response to determining that CAN data is received from an external ECU, the ECU identifying apparatus identifies the ECU based on identification information included in a one-class classifier, identification information of the CAN data which is acquired, and the calculated predetermined attribute value. In other words, the ECU identifying apparatus may identify an external device which transmits the CAN data based on identification information relating to an ECU included in a one-class classifier including an attribute value corresponding to the calculated predetermined attribute value and identification information of the CAN data which is acquired.

The ECU identifying apparatus determines whether an attack is made based on the identified ECU, at operation S970. In response to identification information relating to an ECU of a multi-class classifier not coinciding with identification information of the CAN data which is acquired, the ECU identifying apparatus may determine that an attack is made through an internal ECU. In addition, in response to identification information relating to an ECU included in a one-class classifier not coinciding with identification information of the CAN data which is acquired, the ECU identifying apparatus may determine that an attack is made through an external device.

A method of controlling an ECU identifying apparatus according to the various example embodiments described above may be implemented as a program and a non-transitory computer readable medium which includes the program therein may be provided.

The non-transitory computer readable medium refers to a medium that stores data semi-permanently rather than storing data for a very short time, such as a register, a cache, a memory or etc., and is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the present disclosure. The present teaching can be readily applied to other types of apparatuses. Also, the description of the example embodiments is intended to be illustrative, and not to limit the scope of the claims, and many alternatives, modifications, and variations will be apparent to persons having ordinary skill in the art.

What is claimed is:

1. An ECU identifying apparatus, comprising:
 a communication interface configured to transmit and receive CAN data to and from a plurality of ECUs; and
 a hardware processor configured to measure a power signal of the received CAN data,
 wherein the hardware processor is configured to generate a multi-class classifier that learns a predetermined attribute value with respect to each of the plurality of ECUs and a one-class classifier that learns the predetermined attribute value with respect to all ECUs, wherein the multi-class classifier is a classifier for determining whether an internal attack is made and the one-class classifier is a classifier for determining whether an external attack is made; acquire identification information of the received CAN data; acquire a signal of a predetermined area from the measured power signal; calculate the predetermined attribute value based on the signal of the predetermined area which is acquired, in response to an ECU transmitting the CAN data being an internal ECU; identify an ECU based on identification information included in the multi-class classifier, identification information of the CAN data which is acquired and the calculated predetermined attribute value, in response to an ECU transmitting the CAN data being an external ECU; identify an ECU based on identification information included in the one-class classifier, the identification information of the CAN data which is acquired and the calculated predetermined attribute value; and determine whether an attack is made based on the identified ECU,
 wherein the signal of the predetermined area is a signal of a dominant area, a signal of a recessive area, a signal of a positive-slope area, a signal of a negative-slope area, a signal of a dominant-recessive-dominant (DRD) area, and a signal of a recessive-dominant-recessive (RDR) area,
 wherein the one-class classifier comprises identification information relating to an external ECU and corresponding to the predetermined attribute value of the external ECU,
 wherein the multi-class classifier comprises identification information of the each of the plurality of ECUs in the ECU identifying apparatus and corresponding to the predetermined attribute value of the each of the plurality of ECUs, and
 wherein the hardware processor, in response to the predetermined attribute value being changed, updates the multi-class classifier or the one-class classifier based on a predetermined standard.

2. The ECU identifying apparatus as claimed in claim 1, wherein the hardware processor is configured to measure the power signal in an area from after an ID field to before ACK field of the received CAN data.

3. The ECU identifying apparatus as claimed in claim 1, wherein a predetermined attribute value is at least one from among a mean, root mean square (RMS), standard deviation, average deviation, maximum value, skewness, zero crossing rate (ZCR), kurtosis and non-negative count of a time domain, and is at least one from among a centroid, flatness, entropy, brightness, spread, roll-off, skewness, kurtosis and flux of a frequency domain.

4. The ECU identifying apparatus as claimed in claim 1, wherein the hardware processor is configured to, in response to determining that the CAN data is received from an internal ECU, identify an internal ECU that transmits the CAN data based on identification information with respect to an ECU of the generated multi-class classifier including an attribute value corresponding to the calculated predetermined attribute value and the identification information of the CAN data which is acquired.

5. The ECU identifying apparatus as claimed in claim 4, wherein the hardware processor is configured to, in response to identification information of an ECU of the generated multi-class classifier not being identical to the identification information of the CAN data which is acquired, determine that an attack is made through the internal ECU.

6. The ECU identifying apparatus as claimed in claim 1, wherein the hardware processor is configured to, in response to determining that the CAN data is received from an external apparatus, identify an external apparatus that transmits the CAN data based on identification information with respect to an ECU included in the generated one-class classifier including an attribute value corresponding to the calculated predetermined attribute value and the identification information of the CAN data which is acquired.

7. The ECU identifying apparatus as claimed in claim 6, wherein the hardware processor is configured to, in response to identification information with respect to an ECU included in the generated one-class classifier not being identical to the identification information of the CAN data which is acquired, determine that an attack is made through the external apparatus.

8. The ECU identifying apparatus as claimed in claim 6, wherein the identification information is at least one from among a CAN ID and command information of a transmission ECU.

9. A method of controlling an ECU identifying apparatus, the method comprising:
generating a multi-class classifier that learns a predetermined attribute value with respect to each of ECUs and a one-class classifier that learns the predetermined attribute value with respect to all ECUs, wherein the multi-class classifier is a classifier for determining whether an internal attack is made and the one-class classifier is a classifier for determining whether an external attack is made;
measuring a power signal from CAN data received from a plurality of ECUs;
acquiring identification information of the received CAN data;
acquiring a signal of a predetermined area from the measured power signal;
calculating the predetermined attribute value based on the signal of the predetermined area which is acquired;
in response to an ECU transmitting the CAN data being an internal ECU, identifying an ECU based on identification information included in the multi-class classifier, identification information of the CAN data which is acquired and the calculated predetermined attribute value, and in response to an ECU transmitting the CAN data being an external ECU, identifying an ECU based on identification information included in the one-class classifier, the identification information of the CAN data which is acquired and the calculated predetermined attribute value; and
determining whether an attack is made based on the identified ECU,
wherein the signal of the predetermined area is a signal of a dominant area, a signal of a recessive area, a signal of a positive-slope area, a signal of a negative-slope area, a signal of a dominant-recessive-dominant (DRD) area, and a signal of a recessive-dominant-recessive (RDR) area,
wherein the one-class classifier comprises identification information relating to an external ECU and corresponding to the predetermined attribute value of the external ECU,
wherein the multi-class classifier comprises identification information of the each of the plurality of ECUs in the ECU identifying apparatus and corresponding to the predetermined attribute value of the each of the plurality of ECUs, and
in response to the predetermined attribute value being changed, updating the multi-class classifier or the one-class classifier based on a predetermined standard.

10. The method as claimed in claim 9, wherein the measuring the power signal comprises measuring the power signal in an area from after an ID field to before ACK field of the received CAN data.

11. The method as claimed in claim 9, wherein a predetermined attribute value is at least one from among a mean, root mean square (RMS), standard deviation, average deviation, maximum value, skewness, zero crossing rate (ZCR), kurtosis and non-negative count of a time domain, and is at least one from among a centroid, flatness, entropy, brightness, spread, roll-off, skewness, kurtosis and flux of a frequency domain.

12. The method as claimed in claim 9, wherein the identifying the ECU comprises, in response to determining that the CAN data is received from an internal ECU, identifying an internal ECU that transmits the CAN data based on identification information with respect to an ECU of the generated multi-class classifier including an attribute value corresponding to the calculated predetermined attribute value and the identification information of the CAN data which is acquired.

13. The method as claimed in claim 12, wherein the identifying the ECU comprises, in response to identification information of an ECU of the generated multi-class classifier not being identical to the identification information of the CAN data which is acquired, determining that an attack is made through the internal ECU.

14. The method as claimed in claim 9, wherein the identifying the ECU comprises, in response to determining that the CAN data is received from an external apparatus, identifying an external apparatus that transmits the CAN data based on identification information with respect to an ECU included in the generated one-class classifier including an attribute value corresponding to the calculated predetermined attribute value and the identification information of the CAN data which is acquired.

15. The method as claimed in claim 14, wherein the identifying the ECU comprises, in response to identification information with respect to an ECU included in the generated one-class classifier not being identical to the identification information of the CAN data which is acquired, determining that an attack is made through the external apparatus.

16. The method as claimed in claim 14, wherein the identification information is at least one from among a CAN ID and command information of a transmission ECU.

* * * * *